3,081,217
ADHESIVE AND ITS MANUFACTURE
Clifford H. Pearson, Winston, Oreg., assignor to Roseburg
Lumber Co., Roseburg, Oreg., a corporation of Oregon
No Drawing. Filed Jan. 16, 1959, Ser. No. 787,102
9 Claims. (Cl. 156—328)

This invention relates to an adhesive product and a method for its preparation, and more particularly to an adhesive product and manufacture wherein the adhesive is prepared from a high lignin content vegetable shell material and a phenol-aldehyde condensate resin. The adhesive product is particularly useful in the manufacture of plywood and other laminated wood products suitable for both interior and exterior use.

Generally, it is an object of this invention to provide an improved adhesive and method for its manufacture, wherein a relatively high ratio of vegetable shell material to resin may be employed in making the adhesive (with resulting economies in the cost of the adhesive) and wherein the adhesive product which results may be used in the manufacture of a superior grade of plywood which is characterized by a high degree of interfacial bonding between the veneer layers of the plywood. Other features which grow out of the use of the adhesive of this invention are a substantial reduction of the criticalness required in the selection of the veneer from which the plywood is to be made, in the drying of the veneer, etc.

Adhesives prepared from phenol-aldehyde condensate resins and comminuted vegetable shell material are known in the art. It has been a practice in the past to prepare an adhesive by reacting digested vegetable shell material with a phenol-aldehyde condensate having a molecular weight ranging from 2 thousand to 20 thousand, to produce a copolymerized reaction mass. This was then cooled, and spread over veneer sheets prior to making finished plywood. The adhesive, while satisfactory, had certain disadvantages. For instance, in the manufacture of exterior grade plywood, a relatively large ratio of resin to shell material had to be used in the adhesive formulation. Further, a relatively heavy adhesive spread had to be used. The resin itself, since it was fairly highly advanced to start with, had to be carefully handled in order to prevent premature solidifying and gelling of the adhesive. Further, the density and moisture content of the wood veneer used in the plywood manufacture was highly critical.

In general terms, this invention contemplates the production of an adhesive wherein a low molecular weight phenolic resin is used with the vegetable shell material, and wherein this resin is mixed with the vegetable shell material at two different times. The adhesive is prepared through the process of first reacting the vegetable shell material with a portion of the phenolic resin to obtain a copolymerized mass of resin and shell material. The resulting mass is then cooled to a temperature at which further reaction substantially ceases. Additional low molecular weight phenolic resin is then added to the cooled reaction mass, and intimately mixed therewith. Using the process outlined, exterior grade plywood may be produced from adhesive wherein the resin spread, based on resin solids, per thousand square feet of double glue line is in the range of about 10 pounds, as compared to resin spreads per thousand square feet of double glue line of about 13–15 pounds using other adhesives. The savings in resin cost which results is particularly important when it is realized that the savings of a few dollars per thousand square feet of plywood represents, in some instances, the profit margin to a manufacturer.

The use of the adhesive of this invention has other advantages. As already pointed out, whereas prior art methods of preparing adhesive employed phenolic resins having molecular weights ranging from 2,000 to 20,000 or more, this invention contemplates the use of phenolic resins having molecular weights ranging from 500 to 2,000. The use of a low molecular phenolic resin reduces materially the care which must be exercised in handling the resin before its incorporation into an adhesive. This easier handling of a low molecular weight resin is readily understood when it is remembered that a resin initially having a molecular weight of 1,000, after polymerization to polymers of about twice the original molecular weight, has a molecular weight of only about 2,000; whereas a resin having initially a molecular weight of about 15,000, after polymerization to polymers of about twice the original molecular weight, has a molecular weight of about 30,000. Resins of the latter category are quite highly advanced, and close to solidification. Low molecular weight resins are not only more easily handled, but they also may be shipped as solutions of relatively high solids content (water is conventionally added to a phenolic resin to control advancement of the resin). This results in savings in transportation costs.

The adhesive of this invention is believed to produce a bond between two veneer sheets generally through the process of absorption of the unreacted phenolic resin portion of the adhesive by the wood and also through penetration of the unreacted phenolic resin into the wood through diffusion of the resins in the moisture of the wood. Penetration into the wood to a depth of from 6–8 cells or more results. In the formation of a bond between two veneer sheets, the substantially unreacted, phenolic resin portion of the adhesive functions as an anchoring medium or wetting agent. On curing of a glue line, the substantially unreacted phenolic resin copolymerizes with the copolymerized vegetable shell and resin portion of the adhesive. The reaction of the low molecular weight phenolic resin with the already copolymerized vegetable shell and resin mass occurs quite rapidly, upon the application of heat and pressure. The copolymerized shell material and resin portion of the adhesive, due to its higher molecular weight, does not completely penetrate into the wood. Thus there is assured a thinly layered deposit of adhesive between the wood layers.

Wood veneers vary considerably in their densities and moistures. A single sheet of veneer may contain both sapwood and heartwood portions, and these types of wood have markedly different densities and moisture contents in their green condition. It is not uncommon in a tree to find sapwood portions with moistures ranging up to about 200% based upon the weight of dry wood, whereas portions of the heartwood within the same tree may have moistures of only 25%. With respect to wood density, the summer growth of a tree due to its slower growing rate during the summer period is considerably more dense (specific gravity 0.70 to 0.90) than the springwood growth portions (specific gravity approximately 0.30) when the growing rate of the tree is more rapid. The cells of dense, summer growth wood are relatively closely spaced, and penetration or wetting by ordinary liquid adhesives is difficult.

Prior art methods usually have relied on extreme drying of veneer, as this has a tendency to minimize differences in wood moistures in the veneer. Thus it has been customary to dry veneer so that all portions of the wood treated have moisture contents of less than about 5%, and the average moisture content is about 2% (where heartwood and sapwood exist together in veneer, heartwood portions are dried to about 0% moisture when drying sapwood portions to a moisture content of 5% or less). Adhesive spread over such dried veneers has tended to be absorbed unequally in the various wood portions of the veneers. Using a relatively highly polymerized adhesive, absorption of the adhesive may be satisfactory in the low density wood portions; however, in very dry and high density wood portions insufficient absorption takes place. With lower molecular weight adhesives, over penetration and dispersion takes place in the relatively high moisture content and low density wood portions.

Extreme drying of wood, while minimizing moisture variations in the wood, has the disadvantage of tending to impede the flow of adhesive over the wood surface and the distribution of the adhesive. Further, extreme drying tends to increase checking and casehardening.

According to this invention, wherein substantially unreacted low molecular weight phenolic resin is present in the adhesive, together with more highly polymerized resin, wood having an average dryness of about 10% may be used in making plywood, with good results obtainable. The low molecular weight, unreacted phenolic resin portion penetrates quite readily into the high density, low moisture content portions of the wood. Absorption of the low molecular weight and high molecular weight portions of the adhesive takes place in the low density, high moisture content portions of the wood, with over penetration into these latter portions being prevented due to the presence of the relatively high molecular weight polymers in the adhesive. The result is a plywood product having superior interfacial bonds, with considerably less variation occurring because of wood irregularities.

Advantages which flow from the use of relatively high moisture content veneer in plywood manufacture include savings in drying time and dryer costs. Further, the plywood product itself is superior, since the moisture equilibrium in wood throughout most of the United States is about 9%, and plywood having wood layers of this moisture content are less susceptible to warping.

These and other features, objects, and advantages are attained by the invention, which is more fully described hereinbelow, in conjunction with some specific examples, which are to be considered as illustrative only.

Briefly, the adhesive compositions of this invention may be prepared from a high lignin content, comminuted, vegetable shell material; water; alkaline materials which are included to aid digestion of the comminuted, vegetable shell material; and phenolic resin. An anti-foaming agent is also ordinarily included in the adhesive, to promote ease of processing. Other ingredients, such as dyes, fillers, etc., may be incorporated with the adhesive mixture if desired. The use of the latter additives depends upon the particular use of the adhesive.

The vegetable shell material from which the adhesive compositions may be made comprises materials such as cereal or grain by-products, such as husks of grain, etc., corn cobs, etc.; the shells of such nuts as walnut, filbert, and hickory nuts; the endocarps or stones of drupes such as the stones of the plum, apricot, peach, and prune; and the barks of trees, especially coniferous trees, such as firs, pines, hemlocks, cedars, etc. The latter materials are in abundant supply, particularly in the lumbering states, and thus as a practical matter, the barks of trees constitute the primary source of the shell material.

The barks of trees comprise appreciable amounts of periderm, which is derived from growth of the phellogen and consists of phelloderm and phellem or cork. Bark also normally contains a certain amount of phloem. Bark from various trees, and species of trees will show variation in the amounts of cork and phloem it contains, with some bark selections being made up of large proportions of phloem, and others consisting almost entirely of cork or phelloderm and relatively small amounts of phloem.

In the practice of this invention, the vegetable shell material is first comminuted, using any of various conventional techniques, such as a ball milling. A certain amount of separation of various bark constituents may be accomplished by selective screening of bark powder. For instance, the cork and fiber fractions of bark are less friable than others, and thus it is possible by selective screening to separate bark into various fractions with one fraction comprised largely of cork and fiber and another fraction comprised principally of bark phloem and containing minor amounts of nonphloem constituents. The latter type of material is particularly useful in the process of this invention.

Satisfactory bark powders for the preparation of adhesives according to this invention are powders sold by the Weyerhaeuser Timber Company of Tacoma, Washington, under the designation Silvacon #472 and Silvacon #490. These powders are derived from the bark of Douglas fir (*Pseudotsuga taxifolia*). A sample of the Silvacon #472 powder (the material used in the examples hereinafter set forth) had the following physical and chemical properties:

| | |
|---|---|
| Color | Dark brown. |
| Particle size: | |
| Percent on 28 and 65 mesh Tyler Screen | 0. |
| Percent on 200 mesh Tyler Screen | 51. |
| Specific gravity | 1.44. |
| Percent cellulose | 29. |
| Percent lignin | 59. |
| Percent wax | 7.5. |
| Percent ash | 1.4. |
| Percent solubility in water | 13. |
| Percent solubility in ether | 12. |
| Percent solubility in 2% caustic | 69. |
| pH of aqueous slurry | 3.5. |

In preparing the compositions of this invention, an aqueous mixture of the comminuted vegetable shell material is first usually digested at elevated temperatures over a short period of time, using alkaline materials in the mix to aid the digestion. Exemplary of alkaline materials which are suitable in preparing adhesives of this invention, are the hydroxides, carbonates, and/or bicarbonates of the alkali metals, particularly sodium and potassium. A mixture, for instance, of sodium hydroxide and sodium carbonate is particularly satisfactory. The amount of carbonate and hydroxide employed in any given batch will depend upon the nature and quantity of the other constituents of the mix, and upon various other considerations such as the speed desired in the setting of the adhesive after it is applied over a surface. In preparing the adhesive compositions of this invention, reaction mixtures containing from about 3.5 to 7 parts alkaline material (based on dry weight of the alkaline material) per 10 parts bark powder were found to be highly satisfactory. (Unless otherwise indicated, "parts" as used herein refer to parts by weight, and percentages also are on a weight basis.) Generally when a mixture of sodium carbonate and sodium hydroxide is used as the alkaline material, the weight ratio of one to the other may vary within the range of from about 1:2 to about 2:1. Usually about equal amounts are used.

As already mentioned, a diluent or vehicle is used in preparing the adhesive mixtures of the invention. This ordinarily is water, or water mixed with other suitable liquid. It is a characteristic of the adhesives of this invention that relatively large amounts of water may be used per pound of adhesive mix, without deleteriously affecting the bonding ability of the adhesive. This results in economies, as the spread of the adhesives on the veneer comprises a large percentage of relatively inexpensive material (water). The water in the adhesive gives flowability to the adhesive, and acts as a vehicle carrying the various constituents during their interreaction. In preparing adhesives of this invention, usually from about 120 to 250 parts of water for 80 parts of bark are directly added to the bark prior to digestion of the bark. In addition to this, some additional water usually enters into the adhesive during the adhesive manufacture, as aqueous solutions of alkaline materials and resin are normally used.

As a phenolic resin, the condensation products of a phenol and an aldehyde is employed. These resins comprise the alkali catalyzed polymerization products of such aldehydes as formaldehyde and acetaldehyde, with a phenol, such as phenol itself, cresols, xylenols, etc. Conventionally, a colloidal suspension or solution of the resin is produced by mixing the phenolic constituent and the aldehyde constituent in an aqueous alkaline solution, and heating the mixture until the reaction is carried to the desired end point. The viscosity of the solution is controlled by adding water and dilute caustic soda solution. The resulting product is a resin solution adjusted to contain from about 40 to 60% resin solids, that is, solutions of from 40 to 60% nonvolatile content.

A prime feature of the herein described invention resides in the use of relatively low molecular weight resins and in the mixing of the resin with the bark portion of the adhesive using separate times of addition for portions of the resin. Thus from about 25 to 75% of the total resin to be used is added initially to the bark portion of the adhesive and reacted for a time with this bark portion. Copolymerization of the resin, and of the bark and resin takes place. The reaction mass is then cooled to a temperature wherein further reaction is insignificant, and the remaining portion of the resin is then added to the cooled reaction mass and mixed therewith.

As will be recognized by those skilled in the art, resins prepared from phenol and aldehydes such as formaldehyde under alkaline conditions are progressively advanced from monomeric phenol alcohols to substances of higher molecular weight by connection of unsaturated positions in the aryl group with methylene linkages. For example, phenol reacts with formaledhyde to form ortho or para methylol phenol; ortho-ortho, or ortho-para dimethylol phenol; or symmetrical trimethylol phenol. These monomeric compounds have molecular weights of 124, 154 and 185, respectively.

Under continued reaction, the phenol alcohols advance to substances of higher molecular weight by methylol groups reacting with an unsaturated aryl molecule (mono- or dimethylol phenol or phenol) thus providing an enlarged methylene-connected residue. Also, methylol groups react with each other to split off formaldehyde and connect the affected aryl positions with a methylene linkage.

Any of these monomeric phenol alcohols are unsatisfactory as commercial adhesives for plywood when used under methods described in the prior art. The polarity of the material is high and the viscosity is relatively low so that under heat and pressure used to cure the adhesive, the resin penetrates the wood interfaces leaving insufficient amounts of resin at the glue line to assure a durable bond. In order to minimize this undue penetration, prior art has described the importance of advancing the resin polymers to units of relatively high average molecular weight; from 2000 to as high as 20,000, for example; as determined by such physical-chemical methods as the porous-diaphragm method of Northrup and Anson, which is a steady state diffusion method for determining apparent molecular weights, and which depends on the migration of mobile constituents in solutions toward regions of lower concentration. (Apparent values obtained from such a test method are not absolute but relative, since the initial monomers of a phenol and aldehyde mixture vary in reactivity, some tending to advance rapidly to molecules of higher molecular weight and others, such as ortho-para dimethylol phenol, tending to resist advancement.) This invention contemplates the use of resins having apparent average molecular weights as determined by such a method of 500 to 2,000.

The porous-diaphragm diffusion method of determining molecular weights is one which is well known in the art. In determining the apparent molecular weights of the resins of the examples herein, a diffusion solvent of 65% acidic isopropanol (1%, $H_2SO_4$) and 35% water was used, and determinations were carried out at 20° C. The diffusion constant (D) for a diffusion solvent solution containing 1% phenol was first calculated, using the equation:

$$D = \frac{(\mu_{H_2O})(D_{phenol\ in\ H_2O})}{\mu_{diffusion\ solvent}}$$

where $\mu$ is viscosity and $D_{phenol\ in\ H_2O}$ is the diffusion constant of pure water containing 1% phenol. The calculated value for D was $2.26 \times 10^{-6}$. A diffusion cell then was calibrated and a cell constant (K) for the cell calculated, by noting the rate of transfer of phenol in a diffusion solvent solution of phenol through the diaphragm of the cell, and using the following equation based on Fick's first law:

$$KDt = \log(c_0' - c_0''_2) - \log(c' - c'')$$

where $t$ is time, and $c$'s refer to measured concentrations in the cell at different times. Diffusion was allowed to proceed for about 24 hours. Having determined the cell constant, the diffusion constant of a diffusion solvent solution containing 1% resin was determined, using the aforementioned equation based on Fick's law and values obtained by noting the rate of transfer of the resin through the diaphragm of the cell. Having determined the diffusion constant for a resin, its molecular weight is deducible by means of the formula:

$$M_{resin} = \left(\frac{D_{phenol}}{D_{resin}}\right)^3 (M_{phenol})$$

wherein the M's refer to molecular weight. The above method and related points of procedure are fully discussed in Weissberger's "Physical Methods of Organic Chemistry," part I, chapter 12, second edition, Interscience Publishers, Inc., New York (1949); McBain and Liu, J.A.C.S., volume 53, 59 (1931); and Mouquin and Cathcart, J.A.C.S., volume 57, 1791 (1935).

The porous-diaphragm diffusion method is a reliable method of distinguishing resins that will operate satisfactorily in the process of this invention. Other methods for measuring molecular weight may be used, but these are often affected by ingredients such as caustic alkali, methyl cellulose, and other agents which independently alter such characteristics of a mixture as its viscosity, freezing point depression, boiling point elevation, etc., and thus effect the basis for determining molecular weight in such tests.

A small amount of antifoaming agent is preferably included in the adhesive mix, as gluing machines may have a tendency to produce foaming. An antifoaming agent, such as pine oil or silicone, is valuable in reducing these tendencies. A typical antifoaming agent which may be included, for instance, is pine oil, added at the rate of 1 to 2 parts pine oil per 100 parts phenolic resin solution. When silicone is employed, a silicone mixture of 1 part silicone and 10 parts resin solution added at the rate of 1 part silicone mix per 1,000 parts of resin, is sufficient to produce good antifoaming control. Antifoaming agents of this description are well known in the art.

When an adhesive is prepared in this manner, a relatively high weight ratio of bark to resin may be employed, which results in a reduced cost of the adhesive. Thus it has been found that an exterior grade plywood can be prepared using a bark to resin ratio ranging up to about 4:5 based on the non-volatile or solid content of the resin. With much higher amounts of bark in the adhesive, the holding or bonding power of the adhesive drops off, although the adhesive may be used for other applications. Thus equal amounts of resin and bark may be used for some interior work. Larger amounts of resin do not affect the quality of the adhesive, but they do have the effect of increasing its cost. As contemplated herein, a ratio of 80 parts bark to 200 parts resin, or a bark to resin ratio of 2:5, is practical.

In general, the method of preparing the adhesive of this invention comprises first reacting an aqueous mixture of bark, alkaline material, and a portion of the resin, by heating a mixture of the three constituents. The three constituents may be reacted together all at one time using temperatures of from 150° to 212° F. (reflux temperature), or (and this is usual procedure) an aqueous mixture of alkali and bark may be digested for a short time before the addition of the first resin portion. If the latter procedure is carried out, the alkali and bark are digested at temperatures of from 150° F. to 212° F., over a period of from 15 to 45 minutes. The first resin addendum may then be added to the digested mass, and the resin and bark mixture reacted together for a period of from 5 to 30 minutes at temperatures above about 150° F. If digestion of the bark is carried out at a temperature of about 200° F., on addition of the first resin addendum, the temperature of the mixture will drop to about 160°–170° F., and this temperature may be used for the reaction of the first resin portion with the bark.

After reaction of bark, alkali, and the first resin addendum, the temperature of the reaction mass is lowered to about 100° F. or lower, preferably about 90° F. or lower. Cooling of the resin does not take place immediately, but occurs over a time interval ranging from 20 to 40 minutes, depending upon the size of the reaction vessel employed. After cooling, the remainder of the resin is intimately mixed with the reaction mass, and the adhesive is ready for use. An adhesive thus prepared has a substantial amount of substantially unreacted low molecular weight phenolic resin therein. While the finished adhesive is relatively stable, preferably it should be used within about a six hour period so that further advancement of the adhesive may be kept to a minimum. The portion of low molecular weight resin which is added after cooling of the bark and resin reaction mixture functions as a wetting agent and also as a reactant keeping reactivity in the adhesive. It is for this reason that the final adhesive should be used without too great a time lapse after its final preparation. The reaction mixture of bark and first resin addendum may be stored, however, for relatively long periods of time without materially affecting its properties. Thus it is possible for a manufacturer to prepare this portion at one location, and then ship the mixture to a plant at some said other location where the second resin addition may be added and the final adhesive prepared.

The compositions of this invention may be applied between layers of veneer sheets in a conventional manner. Thus the adhesive may be spread on the veneers using the usual glue applicator machines of the ordinary plywood plant. In the manufacture of plywood, it is preferable that the assembly time for making the plywood, that is, the time interval which elapses between starting an adhesive spread over a veneer piece and the application of heat and pressure to the adhesive to cause setting of the adhesive, be limited to periods of less than about 30 minutes. This aids in preventing presetting or precuring of the adhesive. Drying or setting of the adhesive is hastened as soon as air comes into contact with the resin, and extensive air contact occurs as a result of spreading out the adhesive in a film.

Below are several examples illustrating the adhesive of this invention and its preparation. In these examples, three different phenolic resin solutions were employed, which were made through the condensation of commercial formaldehyde (40% formaldehyde) and commercial phenol (85% phenol) in the presence of an alkaline catalyst. A chemical analysis of these three resin solutions, designated as resin solution #1, resin solution #2, and resin solution #3, respectively, appears in the below set forth table.

TABLE

| | Resin sol. #1 | Resin sol. #2 | Resin sol. #3 |
|---|---|---|---|
| Percent nonvolatile | 55.30 | 59.28 | 48.55 |
| Viscosity, Gardner-Holdt at 25° C | $Z_1Z_2$ | V–W | Y–ZZ |
| Viscosity (tubes) at 25° C | (3,160 cps.) | (977 cps.) | (2,142 cps.) |
| Specific Gravity at 25° C | 1.2163 | 1.2312 | 1.1762 |
| Alkalinity as percent NaOH: | | | |
| of resin | 3.93 | 3.73 | 2.06 |
| of ash | 4.0 | 3.75 | 2.12 |
| Refractive Index at 25° C | 1.5034 | 1.5143 | 1.4769 |
| Percent Free Formaldehyde | 0.44 | 0.44 | 0.46 |
| Percent Ash | 5.40 | 5.04 | 2.78 (Wet Basis) |
| Hot plate cure time at 150° C | 25 sec. | 40 sec. | 40 sec. |
| Gel time at 100° C | 25 min. | 30 min. | 30 min. |
| pH at 25° C | 9.8 | 9.8 | 8.9 |
| Water tolerance or dilutability | 50:1 | 50:1 | 19% |
| Apparent molecular weight (Porous-diaphragm diffusion method) | 1,700 | 1,000 | 1,600 |

*Example 1*

Into a vessel preheated to a temperature of approximately 200° F. were added a mixture of 370 parts water, 70 parts 50% aqueous NaOH, 60 parts dry $Na_2CO_3$, 150 parts bark powder, and ½ part of antifoaming mixture (a mixture prepared from 1 part silicone and 10 parts resin solution #3). These constituents were reacted at a temperature of about 200° F., until the mixture turned dark in color. The time of reaction was approximately 20 to 30 minutes.

To this reaction mixture were added 250 parts of resin solution #3 (or about 120 parts of resin on a solids basis). The resin solution was at room temperature when added, and the addition of the resin caused the temperature of the entire reaction mass to drop to approximately 165° F. The mixture was maintained at this temperature for about 12 minutes, and then cooled over about a 30 minute interval to a temperature of approximately 85 to 90° F. After cooling, an additional 250 parts of resin solution #3 were added, and intimately mixed into the mixture.

The resulting adhesive was used in the manufacture of ¾ inch, five-ply plywood, by spreading the adhesive in a conventional manner between the interfaces of five stacked Douglas fir veneer sheets. The spread of adhesive was about 25 pounds wet adhesive per thousand square feet of glue line (or 50 pounds per thousand square feet of double glue line). The resin portion of the spread, on a solids or nonvolatile basis, thus was about 10 pounds per thousand square feet of glue line. The veneer used in the plywood manufacture had an average moisture content, based on the bone-dry weight of the wood, of 2%, and the spread was made using an assembly time of from about 25 to 30 minutes (that is, the time which elapsed between first starting the spread and the application of heat and pressure was about 25–30 minutes). A press pressure of 185 pounds per square inch, and a press temperature of 285° F. were employed. Pressing time was nine minutes, and the completed plywood was stored without postcure.

Completed plywood panels were subjected to wood failure tests, in which veneer layers are torn apart, and the percent wood failure recorded. Tests were made on the outer plies. A high percent wood failure indicates a good adhesive bond, whereas a low percent wood failure indicates a high degree of delamination, due to failure of the adhesive bond. The Douglas Fir Plywood Association accepts plywood for an exterior grade which shows an average wood failure of 90% or above.

Two different series of plywood panel specimens were tested for wood failure, and these showed wood failures averaging 94.2 and 98.8%, respectively.

A similarly prepared batch of adhesive was used in the production of five-ply, ¾ inch plywood, from veneer sheets having a moisture content averaging about 10–

12%, based on the bone-dry weight of the wood. In this instance, an assembly time of from 4 to 6 minutes was employed. Two different series of plywood specimens were tested for wood failure, with wood failures resulting which averaged 98.0 and 98.8%, respectively.

*Example 2*

An adhesive was prepared by reacting, as in Example 1, a mixture of 370 parts water, 70 parts 50% aqueous NaOH, 60 parts of dry $Na_2CO_3$, 150 parts bark powder and ½ part antifoaming mixture for approximately 30 minutes at a temperature of about 200° F. The resulting mixture was then cooled over about a 30 to 40 minute interval to a temperature of approximately 90° F. To this cooled mixture were added 500 parts resin solution #3.

After mixing in of the resin, the adhesive produced was used in the production of plywood, employing the procedures of Example 1, and using veneer sheets having an average moisture content of approximately 2%. The assembly time was about 25 to 30 minutes. Two different series of speciments were tested for wood failure. Wood failures averaging 75.0 and 52.5%, respectively, were obtained from the tests.

A similar batch of adhesive was used in manufacturing plywood from wood veneers having an average moisture content of approximately 10–12% and using an assembly time of from 4 to 6 minutes. Two different series of specimens from finished plywood panels were tested for wood failure, and these gave average results of 71.7 and 80.0%, respectively.

On examining the panels, apparently the adhesive was underabsorbed by the wood when the very dry veneer was used. With the wetter veneer, overabsorption of the adhesive was apparent. It will be noted that in both instances the wood failure was below that required for exterior grade plywood.

*Example 3*

An adhesive was prepared by mixing in a vessel preheated to 200° F. a mixture of 370 parts water, 70 parts 50% aqueous NaOH, 60 parts dry $Na_2CO_3$, 150 parts bark, and ½ part antifoaming mixture. At the end of about 20 to 30 minutes, 500 parts of resin solution #3 were added to the mixture, which caused a reduction in the temperature of the mass to about 160° F. The resulting mixture was cooked for about 8 minutes, and subsequently cooled over a 30 to 40 minute interval to about 90° F.

Plywood panels were prepared from the resulting adhesive, using the procedures outlined in Example 1, and wood veneers having an average moisture content of 2%. An assembly time of from 20 to 30 minutes was employed. Two different series of plywood specimens were tested for wood failure, and these yielded results averaging 84.0 and 82.5%, respectively. The panels, on inspection, showed evidence of overadvancement of the adhesive and lack of uniformity in the distribution of the adhesive over the wood and impregnation of the adhesive into the wood.

A similar batch of adhesive was prepared and used in preparing plywood from wood veneers having an average moisture content, based on the dry weight of the veneer, of 10%, and using an assembly time of from 4 to 6 minutes. In this instance, two series of plywood panel specimens were tested for wood failure, to yield results of 92.0 and 97.0%, respectively.

It should be noted that the panels prepared from the wetter wood were satisfactory, whereas those prepared from dry wood showed unacceptable results.

*Example 4*

An adhesive was prepared by admixing in a vessel preheated to approximately 190° to 210° F. a mixture of 530 parts water, 80 parts 50% NaOH, 65 parts dry $Na_2CO_3$, 205 parts bark powder, and ½ part antifoam mixture. The mixture was maintained at the raised temperature for about 20 to 30 minutes to yield a dark digested mass. To this mass were added 250 parts of resin solution #2. The temperature of the mass dropped to approximately 165° F. The mixture was maintained at this temperature for approximately 12 minutes.

The reaction mass was then cooled to a temperature of about 90° F., and an additional 250 parts of resin solution #2 were added to the mixture. After mixing of the resin, the resulting adhesive was used in the manufacture of plywood using the procedures of Example 1, veneer having a low moisture content (approximately 2% based on the dry weight of the wood), and an assembly time of 25 to 30 minutes. Two different series of plywood specimens were tested for wood failure, and these yielded results averaging 94.1 and 95.0%, respectively.

Panels were also prepared from wood veneers having moistures averaging 10% based on the dry weight of the wood and using an assembly time of 4 to 6 minutes. Wood failure tests were run on two series of plywood specimens, to yield average results of 97.5 and 97.1%, respectively.

*Example 5*

A batch of adhesive was prepared as in Example 1, save that 125 parts of resin solution #2 were added in the first instance, which reduced the temperature of the mass to about 170° F. This was reacted for 15 minutes at this temperature, and subsequently cooled to about 90° F., over a period of about 30 to 40 minutes. 375 parts of resin solution #2 were then added and mixed with the cooled product.

The resulting adhesive was used in preparing plywood panels, using veneer having an average moisture content of 2% and using an assembly time of from 25 to 30 minutes. A series of plywood specimens was tested for wood failure, and these specimens exhibited an average wood failure of 84.0%.

A similar adhesive was used in preparing plywood panels from veneer pieces having an average moisture content of 10% and using an assembly time of approximately 25 to 30 minutes. Two series of samples were tested to give wood failure results averaging 95.0 and 100.0%, respectively.

*Example 6*

An adhesive mixture was prepared at about 200° to 210° F. 530 parts water, 80 parts 50% NaOH, 65 parts $Na_2CO_3$, 205 parts bark powder, and ½ pound of antifoam mixture. The mixture was heated for a period of about 30 minutes. Subsequently the mixture was cooled, over a period of from 30 to 40 minutes, to a temperature of about 95° F. To the resulting cooled mass were added 500 parts of resin solution #2.

The adhesive so produced, when used in the manufacture of plywood panels employing veneer of 2% average moisture content and an assembly time of 25 to 30 minutes, produced two different series of specimens which evidenced a wood failure averaging 67.0 and 80.0%, respectively. These specimens exhibited a drying up of the adhesive between the veneer sheet interfaces.

A similar batch of adhesive was used in preparing panels from veneer sheets averaging 10% moisture content and using an assembly time of from 4 to 6 minutes. To series of specimens were tested for wood failure, and these gave average results of 81.0 and 84.0%, respectively. In this instance, while the average wood failure was somewhat larger, some overabsorption of the adhesive was noted.

Example 7

An adhesive was prepared by digesting over a 30 minute period, 530 parts water, 80 parts 50% aqueous NaOH, 65 parts dry $Na_2CO_3$, 205 parts bark, and ½ part antifoam mixture at approximately 200° F. To this mixture was added 375 parts of resin solution #2, and the temperature of the mass dropped to aproximately 160° F. The reaction mass was maintained at this temperature for a period of 10 minutes, and then reduced over a 30 to 40 minute period to a temperature of approximately 90° F. Subsequently, 125 parts of resin solution #2 were intimately mixed with the reaction mass.

Plywood panels were prepared using the resulting adhesive mixture, and veneer of 2% average moisture content. The panels were made using an assembly time of from 25 to 30 minutes. A series of panel specimens were tested for wood failure, and an average wood failure of 91.7% resulted.

A similar type of adhesive was used in preparing panels using veneers having an average moisture content of 10%, and using an assembly time of from 4 to 6 minutes. Two series of specimens were tested for wood failure, and average failures of 97.5 and 98.8%, respectively, were observed.

Example 8

An adhesive was prepared by digesting in a vessel preheated to about 200° F. a mixture of about 465 parts water, 80 parts 50% aqueous NaOH, 50 parts dry $Na_2CO_3$, 185 parts bark, and ½ part antifoam mixture. The digestion was carried on for a period of about 20 to 30 minutes. After this time interval, 250 parts of resin solution #1 were added, and the temperature of the mixture dropped to approximately 170° F. The mixture was maintained at this temperature for about 8 minutes, and subsequently cooled over about a 30 minute period to a temperature of approximately 90° F. To the resulting cooled mass was added 250 parts of resin solution #1.

The adhesive so prepared was used in making plywood panels from veneer sheets having an average moisture content of approximately 3% and using an assembly time of approximately 25 to 30 minutes. Two series of plywood specimens were tested for wood failure, and average results of 97.0 and 96.0%, respectively, were obtained.

In all of the adhesive formulations which were prepared using the process of this invention no difficulty was encountered by reason of premature gelling or setting of the adhesive prior to spreading it over the veneer sheets. The adhesives all exhibited good flowability characteristics over the faces of the veneer. The adhesives were relatively stable, and could be used after storage periods of up to 6 hours with little change in their consistencies.

It is particularly important to note that the weight ratio of bark and water to resin in the formulations is relatively large. With normal adhesive spreads, this permits minimal consumption of resin per thousand square feet of glue line. This is a decided advantage in producing economies in manufacture.

While several examples have been set forth to illustrate the invention, it is desired not to be limited to the specific procedures and amounts given, as variations within the scope of the invention will appear to those skilled in the art.

It is claimed and desired to secure by Letters Patent:

1. In the manufacture of adhesive from comminuted vegetable shell material, water, alkali, and a phenol-aldehyde resin, the improvement comprising using as a resin constituent a phenol-aldehyde resin having a molecular weight ranging from about 500 to 2,000, first reacting at temperatures ranging from about 150° F. to reflux temperature and for periods terminated before an insoluble infusible stage resin is produced from about 25 to 75% by weight of the resin with an aqueous mixture of the shell material and alkali to produce a reaction mass of copolymerized shell material and resin, cooling the reaction mass to temperatures wherein further significant reaction substantially ceases, and intimately mixing with the cooled reaction mass the remainder of the unreacted resin to produce an adhesive product containing a substantial amount of substantially unreacted resin.

2. In the manufacture of a high-bark content adhesive useful in the production of interior and exterior grades of plywood from comminuted bark, alkali, and a phenol-aldehyde resin wherein the adhesive contains up to about 80% by weight as much bark as resin based on the nonvolatile content of the resin, the process which comprises using as a resin constituent a phenol-aldehyde resin having a molecular weight ranging from about 500 to 2,000, reacting from about 25% to 75% by weight of the total resin with an aqueous mixture of the bark and alkali at temperatures ranging from about 150° F. to reflux temperature and for periods terminated before an insoluble infusible stage resin is produced to obtain a reaction mass of copolymerized bark and resin, cooling the reaction mass to temperatures below about 100° F., and intimately mixing with the cooled reaction mass the remainder of the unreacted resin.

3. The process of manufacturing plywood comprising preparing an adhesive from comminuted bark, alkali, and a phenol-aldehyde resin of molecular weight ranging from about 500 to 2,000 wherein the adhesive contains from about 40 to 80% by weight as much bark as resin based on the nonvolatile content of the resin; said adhesive being prepared through the steps of (1) initially reacting an aqueous mixture of alkali, the comminuted bark, and from about 25 to 75% by weight of the total resin at temperatures ranging from about 150° F. to reflux temperature and for periods terminated before an insoluble infusible stage resin is produced to obtain a reaction mass of copolymerized bark and resin, (2) cooling the reaction mass to temperatures below about 100° F., and (3) intimately mixing with the cooled reaction mass the remainder of the unreacted resin; preparing a spread of such adhesive between a pair of stacked veneer sheets which have previously been dried to a moisture content of less than about 10% based on the dry weight of wood; and applying heat and pressure to the stacked veneer sheets.

4. The process of manufacturing plywood comprising preparing an adhesive from comminuted bark, alkali, and phenol-adehyde resin of molecular weight ranging from about 500 to 2,000 wherein the adhesive contains from about 40 to 80% by weight as much bark as resin based on the nonvolatile content of the resin; said adhesive being prepared through the steps of (1) initially reacting an aqueous mixture of the comminuted bark, alkali, and from about 50 to 75% by weight of the total resin at temperatures ranging from about 150° F. to reflux temperature and for periods terminated before an insoluble infusible stage resin is produced to obtain a reaction mass of copolymerized bark and resin, (2) cooling the reaction mass to a temperature below about 100° F., and (3) intimately mixing with the cooled reaction mass the remainder of the unreacted resin; preparing a spread of such adhesive between a pair of stacked veneer sheets; said veneer sheets having a moisture content of from about 5 to 10% based on the dry weight of the wood; and applying heat and pressure to the stacked veneer sheets.

5. The process of manufacturing plywood comprising preparing an adhesive from comminuted bark, alkali, and a phenol-aldehyde resin of molecular weight ranging from about 500 to 2,000 wherein the adhesive contains from about 40 to 80% by weight as much bark as resin based on the nonvolatile content of the resin; said adhesive being prepared through the steps of (1) initially reacting an aqueous mixture of alkali and the comminuted bark with from about 25 to 50% by weight of the total resin at temperatures ranging from about 150° F. to reflux temperature and for periods terminated before an insoluble infusible stage resin is produced to obtain a reaction mass of copolymerized bark and resin, (2) cooling the reaction mass to a temperature below about 110° F., and (3) intimately mixing with the cooled reaction mass the remainder of the resin; preparing a spread of such adhesive between a pair of stacked veneer sheets; said sheets having a moisture content of less than about 5% based on the dry weight of the wood; and applying heat and pressure to the stacked veneer sheets.

6. The process of manufacturing adhesive from comminuted bark, alkali, and a phenol-aldehyde condensate resin which comprises digesting an aqueous mixture of about 80 parts by weight bark and alkali at temperatures ranging from about 160° F. to boiling temperature and for a period of from 15 to 45 minutes, reacting with the resulting mixture at temperatures within the same temperature range and for periods terminated before an insoluble infusible stage resin is produced from about 25 to 150 parts by weight of a phenol-aldehyde resin based on the nonvolatile content of the resin to form a reaction mass of copolymerized bark and resin, said resin having a molecular weight within the range of about 500 to 2,000, cooling the reaction mass to a temperature below about 100° F., and intimately mixing with the cooled reaction mass additional phenol-aldehyde resin having a molecular weight ranging from 500 to 2,000, the resin added in the second instance being sufficient to bring the total parts by weight of resin in the mixture to within the range of from about 100 to 200.

7. The process of manufacturing adhesive from comminuted bark, alkali, and phenol-formaldehyde condensate resin which comprises (1) digesting a mixture of about 80 parts by weight bark, alkali, and from 120 to 250 parts by weight water at temperatures ranging from about 160° F. to boiling temperature and for a period of from 15 to 45 minutes, (2) reacting with the resulting mixture at temperatures within the same temperature range and for a period of from about 5 to 30 minutes from about 25 to 150 parts by weight of a phenol-formaldehyde resin based on the nonvolatile content of the resin, said resin having a molecular weight range from 500 to 2,000, (3) cooling the reaction mass to a temperature below about 100° F., and (4) intimately mixing with the cooled reaction mass additional phenol-formaldehyde resin having a molecular weight within the aforementioned range, the resin added in the second instance being sufficient to bring the total parts by weight of resin in the adhesive mixture to within the range of from 100 to 200.

8. The process of manufacturing plywood comprising preparing an adhesive through the steps of (1) digesting a mixture of about 80 parts by weight bark, alkali, and from 120 to 250 parts by weight water at temperatures ranging from about 160° F. to boiling temperature and for a period of from 15 to 45 minutes, (2) reacting with the resulting mixture for a period of from about 5 to 30 minutes and at temperatures within the same temperature range from about 25 to 150 parts by weight of a phenol-formaldehyde resin based on the nonvolatile content of the resin, said resin having a molecular weight ranging from 500 to 2,000, (3) cooling the reaction mass to a temperature below about 100° F., and (4) intimately mixing with the cooled reaction mass additional phenol-formaldehyde resin having a molecular weight within the aforementioned range, the resin added in the second instance being sufficient to bring the total parts by weight of resin in the adhesive mixture to within the range of from 100 to 200; preparing a spread of such adhesive between a pair of stacked veneer sheets which have previously been dried to a moisture content of less than about 10% based on the dry weight of wood; and applying heat and pressure to the stacked veneer sheets.

9. In the manufacture of an adhesive useful in the production of interior and exterior grades of plywood, from comminuted vegetable shell material, water, alkali, and a phenol-aldehyde resin, wherein the adhesive contains from about 40 to 80% by weight as much vegetable shell material as resin based on the non-volatile content of the resin, the process which comprises using as a resin constituent a phenol-aldehyde resin having a molecular weight ranging from about 500 to 2,000, reacting from about 25 to 75% by weight of the total resin with an aqueous mixture of the vegetable shell material and alkali at temperatures ranging from about 150° F. to reflux temperature and for periods terminated before an insoluble infusible stage resin is produced to obtain a reaction mass of copolymerized shell material and resin, cooling the reaction mass to temperatures below about 100° F., and intimately mixing with the cooled reaction mass the remainder of the unreacted resin.

References Cited in the file of this patent

UNITED STATES PATENTS

| | | |
|---|---|---|
| 2,478,943 | Rhodes | Aug. 16, 1949 |
| 2,574,784 | Heritage | Nov. 13, 1951 |
| 2,620,321 | Schrader et al. | Dec. 2, 1952 |
| 2,631,097 | Redfern | Mar. 10, 1953 |
| 2,727,869 | Ash et al. | Dec. 20, 1955 |
| 2,781,286 | Ayers et al. | Feb. 12, 1957 |
| 2,781,327 | Ayers et al. | Feb. 12, 1957 |
| 2,878,197 | Baxter et al. | Mar. 17, 1959 |

OTHER REFERENCES

Williamson et al.: "Agricultural Residue Flours as Extenders in Phenolic Resin Glues for Plywood," Modern Plastics, October 1949, pages 111–112 and 169–174.